(No Model.)

T. C. BELDING.
JOINTER FOR PLOWS.

No. 307,832.  Patented Nov. 11, 1884.

Witnesses:
Harry Frease.
John A. Mack.

Inventor:
Thomas C. Belding,
per Fred W. Bond
Attorney.

UNITED STATES PATENT OFFICE.

THOMAS C. BELDING, OF WAYNESBURG, ASSIGNOR OF ONE-HALF TO THOMAS C. SNYDER, OF CANTON, OHIO.

JOINTER FOR PLOWS.

SPECIFICATION forming part of Letters Patent No. 307,832, dated November 11, 1884.

Application filed July 11, 1884. (No model.)

*To all whom it may concern:*

Be it known that I, THOMAS C. BELDING, a citizen of the United States, residing at Waynesburg, in the county of Stark and State of Ohio, have invented certain new and useful Improvements in Colters or Jointers for Plows; and I do hereby declare that the following is a full, clear, and exact description of the same, reference being had to the annexed drawings, making a part of this specification, and to the letters and figures of reference marked thereon, in which—

Figure 1:
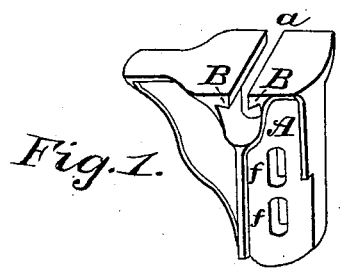
Figure 2:
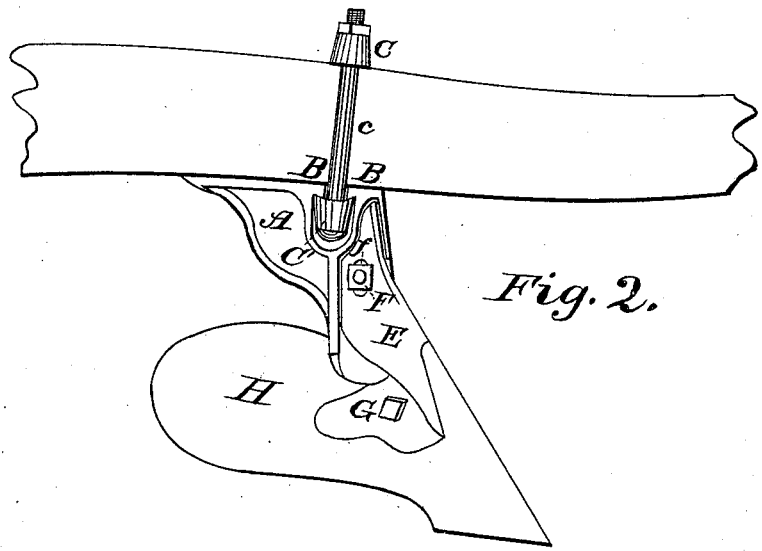
Figure 3:
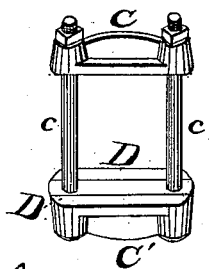

Figure 1 is a perspective view of frame, showing it detached from beam. Fig. 2 is a side elevation showing jointer attached to beam. Fig. 3 is a detached view of clamping devices.

The present invention has relation to that class of jointers or colters for plows designed to be attached at any point desired on the beam of the plow, and also adjusted laterally to any point desired; and its nature consists in providing a frame or arm, and in providing bars, and in the several parts and combination of parts hereinafter pointed out in the claim.

Similar letters of reference indicate corresponding parts in the drawings.

In the accompanying drawings, A represents the frame, which is substantially of the form shown in the drawings, the top or upper part of which is made smooth, so as to fit the under side of the beam. The upper part of this frame is provided with the opening $a$, which is formed large at its lower end, as seen in Figs. 1 and 2, and is so formed to admit the bar C', as seen in Fig. 2. The frame A is provided with the dovetail shoulders B B, which are for the purpose of receiving and holding the correspondingly-formed shoulders D D on the bar C'.

The object of forming the shoulders B B and D D dovetailed is to bind the upper parts of the frame A, thereby preventing the frame from being broken by a sudden or over strain when it is attached to the beam by means of the bars C C' and the clamping-bolts $c$, and in use the jointer H is attached to the frame A by means of the arm E and the bolt F, in the ordinary manner. Slots $f$ are formed in the frame A, so that the arm E may be adjusted.

It will be seen that by my peculiar arrangement I am enabled to place the colter or jointer proper at any point desired on the beam, and also adjust it laterally to any point desired within the limits of the bar C' by loosening the bolts $c$ and moving the frame A to any point desired.

The holes in the bar C' should be formed square, so as to prevent the bolt $c$ from turning while tightening the nuts.

Having now fully described my invention, what I claim as new, and desire to secure by Letters Patent, is—

The combination, with the frame A, provided with the opening $a$ and the dovetail shoulders B B, of the bar C', provided with the shoulders D D, and the clamping-bolts $c$, substantially as and for the purpose specified.

In testimony that I claim the above I have hereunto subscribed my name in presence of two witnesses.

THOMAS C. BELDING.

Witnesses:
FRED. W. BOND,
LEVI PINTZ.